(12) United States Patent
Wurth

(10) Patent No.: US 8,102,202 B2
(45) Date of Patent: Jan. 24, 2012

(54) MODEM UNIT AND MOBILE COMMUNICATION UNIT

(75) Inventor: Bernd Wurth, Landsberg am Lech (DE)

(73) Assignee: Infineon Technologies AG, Neubiberg (DE)

( * ) Notice: Subject to any disclaimer, the term of this patent is extended or adjusted under 35 U.S.C. 154(b) by 739 days.

(21) Appl. No.: 12/190,183

(22) Filed: Aug. 12, 2008

(65) Prior Publication Data

US 2010/0040124 A1    Feb. 18, 2010

(51) Int. Cl.
*H04L 27/00* (2006.01)
(52) U.S. Cl. .......... 329/311; 332/106; 375/222
(58) Field of Classification Search .......... 329/300, 329/304, 311; 332/100, 103, 106; 375/222, 375/259

See application file for complete search history.

(56) References Cited

U.S. PATENT DOCUMENTS

| | | | | |
|---|---|---|---|---|
| 5,335,276 | A * | 8/1994 | Thompson et al. | 380/266 |
| 5,638,540 | A * | 6/1997 | Aldous | 713/300 |
| 5,809,432 | A * | 9/1998 | Yamashita | 455/575.1 |
| 5,974,528 | A | 10/1999 | Tsai et al. | |
| 6,380,031 | B1 | 4/2002 | Mehrad et al. | |
| 7,162,279 | B2 * | 1/2007 | Gupta | 455/574 |
| 7,281,144 | B2 * | 10/2007 | Banginwar et al. | 713/320 |
| 7,502,817 | B2 * | 3/2009 | Ryan | 709/200 |
| 7,684,833 | B2 * | 3/2010 | Marschalkowski et al. | 455/574 |
| 2002/0083432 | A1 * | 6/2002 | Souissi et al. | 717/178 |
| 2008/0104428 | A1 * | 5/2008 | Naffziger et al. | 713/300 |

* cited by examiner

*Primary Examiner* — David Mis
(74) *Attorney, Agent, or Firm* — Eschweiler & Associates, LLC

(57) ABSTRACT

A modem unit includes a first semiconductor die that includes a power management unit and an embedded flash memory. A mobile communication unit includes a modem unit residing on a first semiconductor die. The first semiconductor die also includes a power management unit and an embedded flash memory.

22 Claims, 6 Drawing Sheets

MODEM UNIT AND MOBILE COMMUNICATION UNIT

FIELD OF THE INVENTION

This invention relates to a modem unit, a mobile communication unit, and a method for producing a mobile communication unit.

BACKGROUND OF THE INVENTION

A mobile communication unit may comprise a modem (modulator/demodulator) unit, which encodes information and modulates a signal to be transmitted, and also demodulates a received signal and decodes information contained therein. By use of a modem unit a signal is produced that can be transmitted easily and a received signal can be decoded to reproduce the original information. Modems can be implemented not only in mobile communication units but also in other communication units like stationary communication units, data processing units, personal computers or the like. Modem units can comprise memory units like volatile and non-volatile memories for storing different kinds of information or data therein.

BRIEF DESCRIPTION OF THE DRAWINGS

Aspects of the invention are made more evident by way of example in the following detailed description of embodiments when read in conjunction with the attached drawing figures.

DETAILED DESCRIPTION OF THE INVENTION

Figure 1:
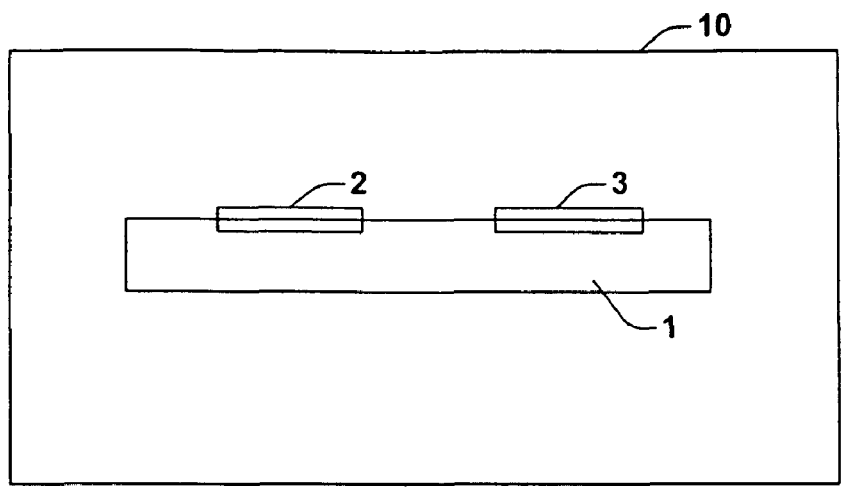
FIG. 1 schematically illustrates a block diagram of a modem unit according to an embodiment.

In the following, one or more aspects and embodiments of the invention are described with reference to the drawings, wherein like reference numerals are generally utilized to refer to like elements throughout. In the following description, for purposes of explanation, numerous specific details are set forth in order to provide a thorough understanding of one or more aspects of embodiments of the invention. It may be evident, however, to one skilled in the art that one or more aspects of the embodiment of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

In addition, while a particular feature or aspect of an embodiment may be disclosed with respect to only one of several implementations, such features or aspects may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements cooperate or interact with each other regardless whether they are in direct physical or electrical contact, or they are not in direct contact with each other. Also, the term "exemplary" is merely meant as an example, rather than the best or optimal.

Referring to FIG. 1, there is shown a schematic block diagram of a modem unit according to an embodiment. The modem unit 10 comprises a semiconductor die 1 comprising a power management unit or power supply unit 2 and an embedded flash memory 3. The power management unit 2 is responsible for the supply of electrical power to the sub-units and sections of the modem unit 10.

According to an embodiment of the modem unit 10 of FIG. 1, the semiconductor die 1 with the power management unit 2 and the embedded flash memory 3 can be housed in a package like, for example, a mold package. The package may comprise outer electrical contact elements connected to contact elements of the power management unit 2 and the embedded flash memory 3, the outer electrical contact elements being, for example, in the form of pins or flat contact pads ("lands").

According to one embodiment of the modem unit 10 of FIG. 1, the power management unit 2 and the embedded flash memory 3 can be electrically connected with each other by electrical connection elements integrated on the semiconductor die 1.

According to one embodiment of the modem unit 10 of FIG. 1, the modem unit 10 further comprises a baseband unit or baseband processor which can be electrically coupled to the power management unit 2. In one embodiment the baseband unit can be fabricated on another semiconductor die which can be packaged in its own package or which can be integrated with the semiconductor die 1 in one package. According to a further embodiment, the modem unit 10 may further comprise a radio frequency (RF) transceiver unit electrically coupled to the baseband unit. In one embodiment the radio frequency transceiver unit can be fabricated on another semiconductor die which can be packaged in its own package. The radio frequency transceiver unit can also be fabricated together with the baseband unit on a single (monolithic) semiconductor die. This semiconductor die can be packaged in its own package or it can be packaged together with the semiconductor die 1 in one single package. These embodiments will be explained in more detail further below in connection with FIG. 6.

According to one embodiment of the modem unit 10 of FIG. 1, in the embedded flash memory 3 one or more of calibration data, network parameters, security data and debug data are stored. As will be explained further below, the modem unit 10 can be part of a mobile communication unit. During production of the mobile communication unit, calibration data like, for example, radio frequency calibration data are generated which can be stored in the embedded flash memory 3. Moreover, during operation of the mobile communication unit, security data, debug information and parameters of the communication network are generated and periodically updated, wherein those parameters can also be stored in the embedded flash memory 3.

According to one embodiment of the modem unit 10 of FIG. 1, the power management unit 2 and the embedded flash memory 3 can be processed on the semiconductor die 1 by a CMOS process technology like, for example, a 130 nm CMOS process technology.

According to one embodiment of the modem unit 10 of FIG. 1, the modem unit 10 further comprises a baseband unit which comprises a central processing unit (CPU), wherein an operation program of the central processing unit is not stored in the embedded flash memory 3. Instead the operation program of the central processing unit can be stored elsewhere like, for example, in a further unit which is electrically coupled to the modem unit 10, as will be explained in greater detail below.

Figure 2:
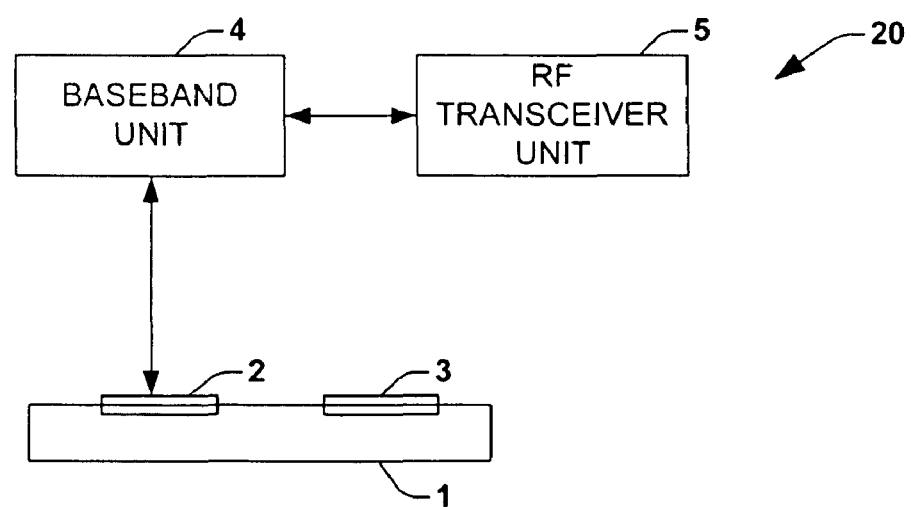
FIG. 2 schematically illustrates a block diagram of a modem unit according to an embodiment.

Referring to FIG. 2, there is shown a schematic block diagram of a modem unit according to an embodiment. The modem unit 20 comprises a semiconductor die 1 comprising a power management unit 2 and an embedded flash memory 3. The semiconductor die 1 with the power management unit 2 and the embedded flash memory 3 is electrically coupled to a baseband unit 4 like a baseband processor. The electrical connection between the semiconductor die 1 and the baseband unit 4, in one embodiment, can be comprised of one or several uni-directional electrical connection lines, each one for transmitting signals and messages in one direction, respectively. In principle it is also possible to provide a bi-directional electrical connection line, in particular one single bi-directional electrical connection line as the electrical connection between the semiconductor die 1 and the baseband unit 4.

The modem unit 20 of FIG. 2 further comprises a radio frequency (RF) transceiver unit 5 which is electrically coupled to the baseband unit 4. The electrical connection between the baseband unit 4 and the radio frequency transceiver unit 5 can also be comprised of one or several uni-directional electrical connection lines, each one for transmitting signals and messages in one direction, respectively. In principle it is also possible to provide a bi-directional electrical connection line as the electrical connection between the semiconductor die 1 and the baseband unit 4 between the baseband unit 4 and the radio frequency transceiver unit 5.

In one exemplary embodiment the modem unit 20 of FIG. 2 can be part of a mobile communication unit as will be outlined below in connection with further embodiments.

According to one embodiment of the modem unit 20 of FIG. 2, RF calibration data which are generated during production of the modem unit 20 or at other times, in particular the RF transceiver unit 5, can be stored in the embedded flash memory 3. Moreover, network parameters of the communication network to be used with the mobile communication unit can also be stored in the embedded flash memory 3.

According to one embodiment of one of the modem units 10 or 20 of FIGS. 1 and 2, the modem unit 10 or 20 in addition includes a volatile memory like, for example, a RAM.

Figure 3:
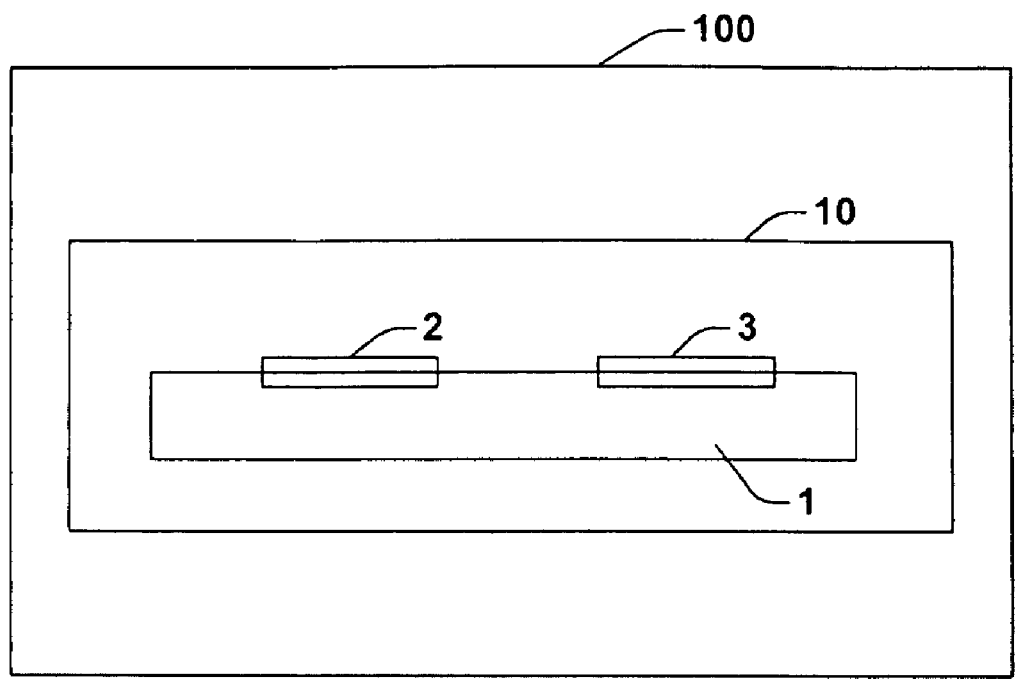
FIG. 3 schematically illustrates a block diagram of a mobile communication unit according to an embodiment.

Referring to FIG. 3, there is shown a schematic block diagram of a mobile communication unit according to one embodiment. The mobile communication unit 100 comprises a modem unit 10 comprising a semiconductor die 1, wherein the semiconductor die 1 comprises a power management unit 2 and an embedded flash memory 3.

According to one embodiment of the mobile communication unit 100 of FIG. 3, the mobile communication unit 100 further comprises an application unit which is electrically coupled to the modem unit 10. The application unit or application sub-system can perform particular functions which are not or at least not directly related to the mobile communication functions of the mobile communication unit. These particular functions can, for example, be comprised of video games control, photo-camera control, audio function control (MP3 player, etc.) or address book functions. The mobile communication unit 100 can thus consist of or be comprised of a so-called smart phone.

According to one embodiment of the mobile communication unit 100 of FIG. 3, the modem unit 10 further comprises a baseband unit like a baseband processor, the baseband unit comprising a central processing unit (CPU). According to a further embodiment thereof, in case that the mobile communication unit 100 comprises an application unit, the application unit comprises a memory unit containing an operation program for the operation of the central processing unit of the baseband unit. The memory unit can, for example, comprise a non-volatile memory like, for example, a flash memory like a NOR flash memory or a NAND flash memory. The memory unit may in addition comprise a volatile memory like, for example, a RAM.

According to one embodiment of the mobile communication unit 100 of FIG. 3, in the embedded flash memory 3 one or more of calibration data, like RF calibration data, network parameters of the communication network used by the mobile communication unit, security data and debug data are stored.

It is to be noted that embodiments of the mobile communication unit 100 of FIG. 3 can be provided based on the embodiments of the modem unit presented above in connection with FIGS. 1 and 2.

Figure 4:
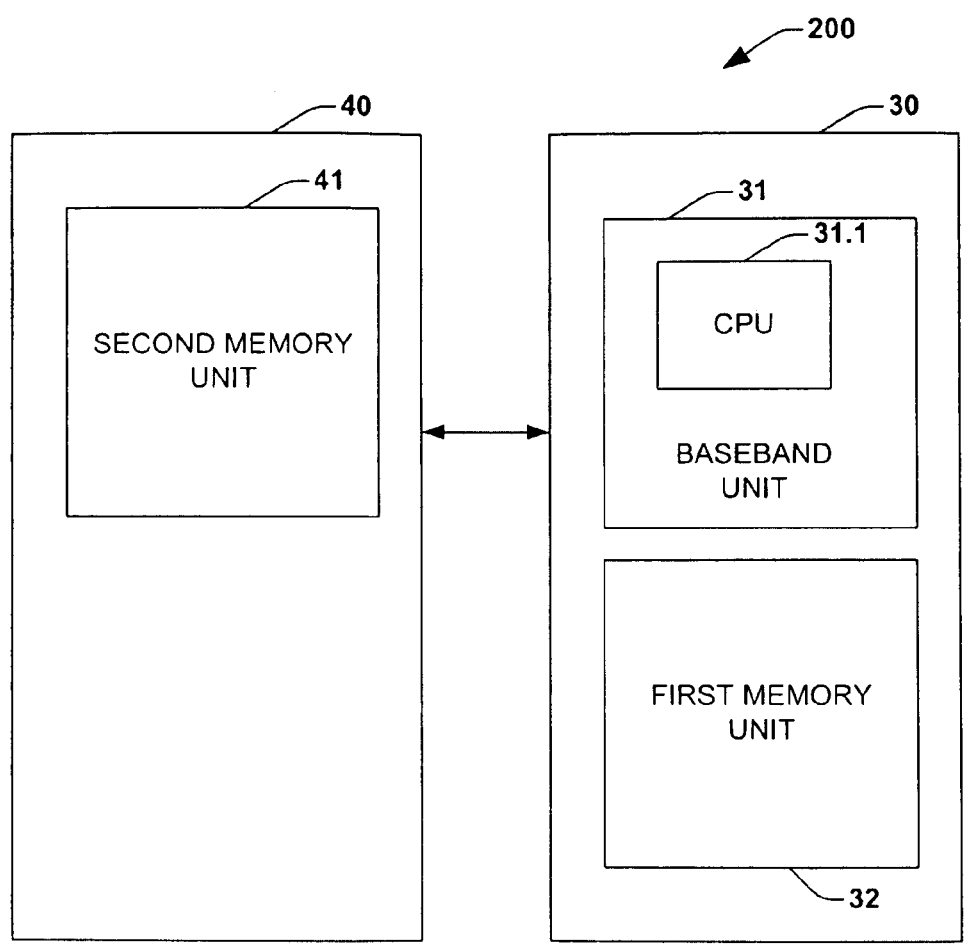
FIG. 4 schematically illustrates a block diagram of a mobile communication unit according to an embodiment.

Referring to FIG. 4, there is shown a schematic diagram of a mobile communication unit according to one embodiment. The mobile communication unit 200 comprises a modem unit 30 comprising a baseband unit 31, said baseband unit 31 comprising a central processing unit (CPU) 31.1, and a first memory unit 32 storing one or more of calibration data, network parameters, security data and debug data, and the mobile communication unit 200 further comprising an application unit 40 comprising a second memory unit 41 storing an operation program for the operation of the central processing unit 31.1.

The modem unit 30 and the application unit 40 can be electrically coupled to each other by one or several uni-directional electrical connection lines, each one for transmitting signals and messages in one direction, respectively. In principle it is also possible to provide a bi-directional electrical connection line, in particular one single bi-directional electrical connection line as the electrical connection between the modem unit 30 and the application unit 40.

According to one embodiment of the mobile communication unit 200 of FIG. 4, the first memory unit 32 is a flash memory.

According to one embodiment of the mobile communication unit 200 of FIG. 4, the modem unit 30 comprises at least a first semiconductor die, the first semiconductor die comprising a power management unit and the first memory unit. According to a further embodiment thereof, the first memory unit can be an embedded flash memory and the power management unit and the embedded flash memory are integrated on the first semiconductor die. According to a further embodiment thereof, the baseband unit 31 can be fabricated on a second semiconductor die and the second semiconductor die can be packaged together with the first semiconductor die within one package. According to a further embodiment thereof, the modem unit 30 further comprises a radio frequency (RF) transceiver unit. The radio frequency transceiver unit can be fabricated on a third semiconductor die which can be packaged in its own package. The radio frequency transceiver unit can also be fabricated together with the baseband unit on the second semiconductor die. The second semiconductor die can be packaged in its own package or it can be packaged together with the first semiconductor die 1 in one single package. These embodiments will be explained in more detail further below in connection with FIG. 6.

Figure 5:
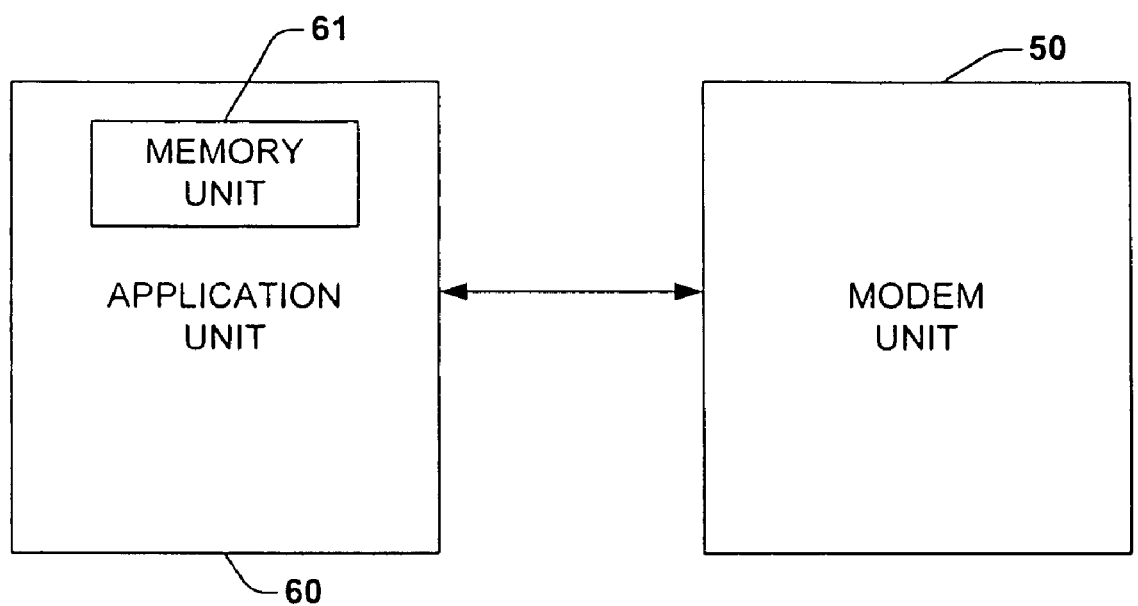
FIG. 5 schematically illustrates a block diagram of a mobile communication unit according to an embodiment.

Referring to FIG. 5, there is shown a schematic block diagram of a mobile communication unit according to one embodiment. The mobile communication unit 300 comprises a modem unit 50 and an application unit 60 comprising a memory unit 61, said memory unit 61 being accessible by the modem unit 50 and the application unit 60.

The modem unit 50 and the application unit 60 can be electrically coupled with each other by use of one or several unidirectional electrical connection lines, each one for transmitting signals and messages in one direction, respectively. In principle it is also possible to provide a bi-directional electrical connection line, in particular one single bi-directional electrical connection line as the electrical connection between the modem unit 50 and the application unit 60.

According to one embodiment of the mobile communication unit 300 of FIG. 5, the modem unit 50 comprises a baseband unit, wherein the baseband unit comprises a central processing unit (CPU), wherein an operation program for operating the central processing unit is stored in the memory unit 61.

According to an embodiment of the mobile communication unit 300 of FIG. 5, the modem unit 50 comprises a first semiconductor die comprising a power management unit and an embedded flash memory. According to a further embodiment thereof, one or more of calibration data, network parameters, security data and debug data are stored in the embedded flash memory. According to another embodiment the modem unit 50 further comprises a baseband unit which may also be arranged or integrated on the semiconductor die.

Figure 6:
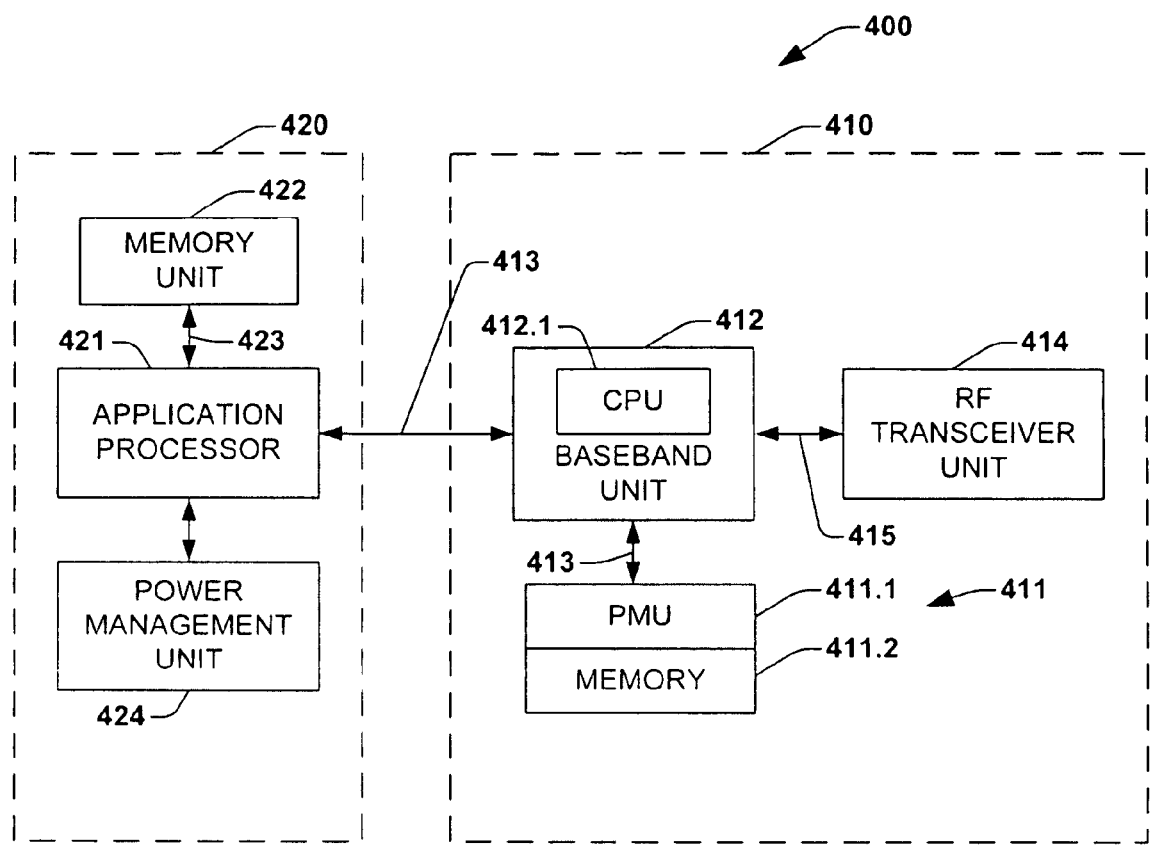
FIG. 6 schematically illustrates a block diagram of a mobile communication unit according to an embodiment.

Referring to FIG. 6, there is shown a schematic block diagram of a mobile communication unit according to one embodiment. The mobile communication unit 400 comprises a modem unit or modem sub-system 410 and an application unit or application sub-system 420. The modem unit 410 and the application unit 420 are electrically coupled to each other by means of one or several uni-directional electrical connection lines, each one for transmitting signals and messages in one direction, respectively. In principle it is also possible to provide a bi-directional electrical connection line, in particular one single bi-directional electrical connection line as the electrical connection between the modem unit 410 and the application unit 420. The modem unit 410 comprises a combined power management and storage unit 411. The power management and storage unit 411 is comprised of a first semiconductor die comprising a power management unit 411.1 and an embedded flash memory 411.2. The modem unit 410 further comprises a baseband unit 412 which is electrically coupled to the power management and storage unit 411 by means of one or several uni-directional electrical connection lines as denoted with the reference sign 413, wherein each one of the lines is for transmitting signals and messages in one direction, respectively. In principle it is also possible to provide a bi-directional electrical connection line, in particular one single bi-directional electrical connection line as the electrical connection between the baseband unit 412 and the power management and storage unit 411. The baseband unit 412 comprises a central processing unit 412.1. The modem unit 410 further comprises a radio frequency transceiver unit 414 which is electrically connected to the baseband unit 412 by means of one or several uni-directional electrical connection lines as denoted with the reference sign 415, wherein each one of the lines is for transmitting signals and messages in one direction, respectively. In principle it is also possible to provide a bi-directional electrical connection line, in particular one single bi-directional electrical connection line as the electrical connection between the baseband unit 412 and the RF transmission unit 414.

The application unit 420 comprises an application processor 421 which is electrically connected to the baseband unit 412 of the modem unit 410 by means of the electrical connection 430. The application unit 420 further comprises a memory unit 422 which is electrically connected to the application processor 421 by means of one or several uni-directional electrical connection lines as denoted with the reference sign 423, wherein each one of the lines is for transmitting signals and messages in one direction, respectively. In principle it is also possible to provide a bi-directional electrical connection line, in particular one single bi-directional electrical connection line as the electrical connection between the memory unit 422 and the application processor 421. The memory unit 422 can comprise a non-volatile memory like, for example, a flash memory like a NAND flash memory or a NOR flash memory or a PCM (phase change memory), and it can further comprise a volatile memory like, for example, an SDRAM memory. The memory unit 422, in one particular example, the non-volatile memory, stores the operation program of the central processing unit 412.1 of the baseband unit 412 of the modem unit 410. The embedded flash memory 411.2 of the combined power management and storage unit 411 of the modem unit 410 stores one or more of radio frequency calibration data, network parameters, security data and debug data of the communication network. The application unit 420 further comprises an application power management unit 424.

In one embodiment of the combined power management and storage unit 411, the embedded flash memory 411.2 is integrated together with the power management unit 411.1 on one semiconductor die as made possible by process technologies such as, for example, a 130 nm CMOS technology which combines high-voltage and high-current support with digital (130 nm) and low-density non-volatile memory properties.

One advantage of the mobile communication unit 400 of FIG. 6 is that the modem unit 410 never needs to access the flash memory unit ("system flash") of the memory unit 422 of the application unit 420 after the boot sequence of the central processing unit 412.1 of the baseband unit 412 has been completed. The flash memory unit of the memory unit 422 contains the operation program of the central processing unit 412.1 of the baseband unit 412 and it can be accessed via driver software running on the central processing unit of the application processor 421. Therefore only at the beginning, i.e. during a boot period the baseband unit 412 will access to the flash memory unit of the memory unit 422 via the application processor 421 in order to copy the operation program of its central processing unit 412.1, as stored in the flash memory unit of the memory unit 422, to a volatile memory (RAM) that is comprised in the modem unit 410 or that is comprised in the memory unit 422.

A further advantage of the mobile communication unit 400 of FIG. 6 is that radio frequency calibration data can be stored locally in the power management and storage unit 411, i.e. in the embedded flash memory 411.2 contained therein. This means that during production of the modem unit 410, radio frequency calibration data can be stored on the modem subsystem so that the modem unit 410 can be produced independent from the production of the application unit 420.

According to one embodiment it is one advantageous aspect of the mobile communication unit 400 of FIG. 6 that the modem unit's 410 code and non-volatile data (such as calibration data and network parameters) are partitioned between the flash memory 411.2 contained in the power management and storage unit 411 of the modem sub-system 410 and the memory unit 422 of the application sub-system 420, in particular the flash memory contained therein.

According to one embodiment shown in FIG. 6, the modem unit 410 is comprised of a 2-chip-modem sub-system wherein the term "chip" has the meaning of a semiconductor package. The 2-chip-modem sub-system comprises a first semiconductor package combining the baseband processor 412 and the power management and storage unit 411 containing the embedded flash memory 411.2, and a second semiconductor package containing the radio frequency transceiver unit 414. In this embodiment each one of the power management and storage unit 411, the baseband processor 412 and the RF transceiver unit 414 is fabricated on its own semiconductor die, respectively.

According to one embodiment of the mobile communication unit as shown in FIG. 6, the modem unit 410 is comprised of a single-chip modem sub-system comprising one single semiconductor package combining the baseband processor 412, the radio frequency transceiver 414 and the power management and storage unit 411 which contains the flash memory 411.2. According to one embodiment thereof the baseband processor 412, the radio frequency transceiver 414 and the power management and storage unit 411 are each fabricated on a separate semiconductor die. In another embodiment the baseband processor 412 and the radio frequency transceiver 414 are integrated together on a first semiconductor die and the power management and storage unit 411 is integrated together with the flash memory 411.2 on a second semiconductor die.

According to one embodiment of the mobile communication unit of FIG. 6, the modem unit 410 is comprised of a 3-chip-modem sub-system including a first semiconductor package that combines the baseband processor 412 and the power management and storage unit 411 which contains the flash memory unit 411.2, a second semiconductor package comprising the radio frequency transceiver unit 414, and a third semiconductor package comprising a random access memory (RAM) for the following purpose. During boot time of the central processing unit 412.1 of the baseband unit 412, the baseband unit 412 accesses the memory unit 422 of the application unit 420 via the application processor 421 by copying code out the memory unit 422. The code can then be copied to the RAM memory as arranged on the third semiconductor package of the modem unit 410 and the code can be used for loading the operational program into the CPU.

Figure 7:
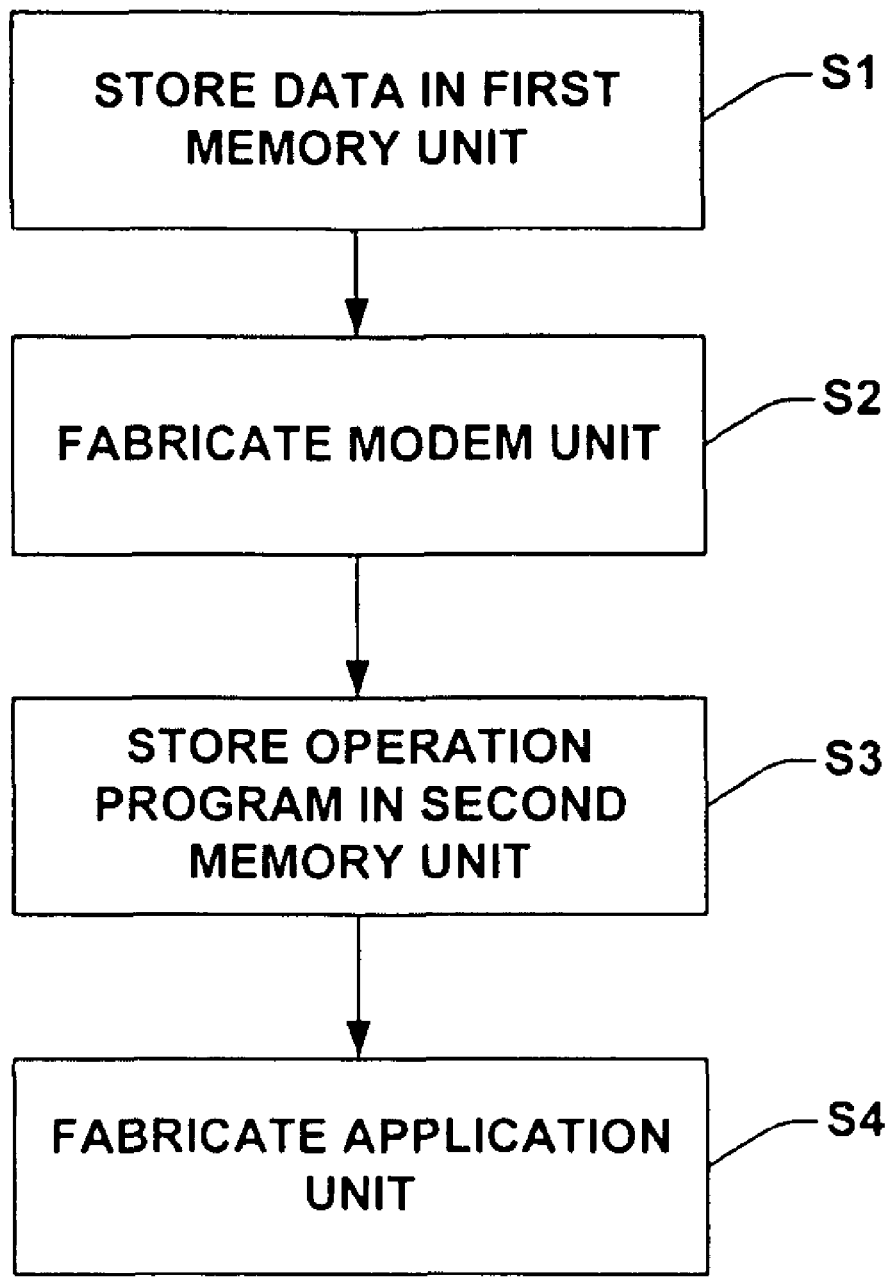
FIG. 7 illustrates a flow diagram of a method for producing a mobile communication unit according to an embodiment.

Referring to FIG. 7, there is shown a flow diagram of one embodiment of a method for producing a mobile communication unit. While the exemplary method is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. The method comprises storing one or more of calibration data, network parameters, security and debug data in a first memory unit at s1. The method further comprises fabricating a modem unit, wherein the modem unit comprises a first memory unit and a baseband unit, and wherein the baseband unit comprises a central processing unit at s2. The method still further comprises storing an operation program for the operation of the central processing unit in a second memory unit at s3, and fabricating an application unit, wherein the application unit comprises the second memory unit.

According to one embodiment of the method of FIG. 7, the method further comprises fabricating a semiconductor die comprising a power management unit and the first memory unit.

According to one embodiment of the method of FIG. 7, the method further comprises fabricating a semiconductor die comprising a power management unit, the first memory unit and the baseband unit.

It is to be understood that the above description is intended to be illustrative and not restrictive. The application is intended to cover any variations of the invention. The scope of the invention includes any other embodiments and applications in which the above structures and methods may be used. The scope of the invention should therefore be determined with reference to the appended claims along with the scope of equivalence to which such claims are entitled.

It is emphasized that the abstract is provided to comply with 37 CFR. Section 1.72(b) requiring an abstract that will allow the reader to quickly ascertain the nature and gist of a technical disclosure. It is submitted with the understanding that it will not be used to interpret or limit the scope of meaning of the claims.

What is claimed is:

1. A modem unit, comprising
a first semiconductor die comprising a power management unit embodied in hardware and an embedded flash memory.

2. The modem unit according to claim 1, further comprising:
a baseband unit coupled to the power management unit.

3. The modem unit according to claim 2, wherein the baseband unit is arranged on a second semiconductor die.

4. The modem unit according to claim 1, wherein in the embedded flash memory one or more of calibration data, network parameters, security data and debug data are stored.

5. The modem unit according to claim 2, further comprising:
a radio frequency unit coupled to the baseband unit.

6. The modem unit according to claim 5, wherein the radio frequency unit is arranged on the second semiconductor die or on a third semiconductor die.

7. A mobile communication unit, comprising:
a modem unit comprising a first semiconductor die, the first semiconductor die comprising a power management unit embodied in hardware and an embedded flash memory.

8. The mobile communication unit according to claim 7, further comprising:
an application unit coupled to the modem unit.

9. The mobile communication unit according to claim 8, wherein the modem unit comprises a baseband unit, the baseband unit comprising a central processing unit.

10. The mobile communication unit according to claim 9, wherein the application unit comprises a memory unit containing an operation program comprising instructions for the operation of the central processing unit.

11. The mobile communication unit according to claim 7, wherein in the embedded flash memory one or more of calibration data, network parameters, security data and debug data are stored.

12. The mobile communication unit according to claim 9, wherein the baseband unit is arranged on a second semiconductor die.

13. A mobile communication unit, comprising:
a modem unit comprising a baseband unit, the baseband unit comprising a central processing unit, and a first memory unit configured to store therein one or more of calibration data, network parameter, security data and debug data, wherein the modem unit resides on a first semiconductor die, and wherein a power management unit embodied in hardware and the first memory unit also resides on the first semiconductor die; and an application unit comprising a second memory unit configured to store therein an operation program for the operation of the central processing unit.

14. The mobile communication unit according to claim 13, wherein the first memory unit comprises a flash memory.

15. The mobile communication unit according to claim 13, wherein the baseband unit is arranged on a second semiconductor die.

16. The mobile communication unit according to claim 15, further comprising:

a radio frequency unit arranged on the second semiconductor die or on a third semiconductor die.

17. A mobile communication unit, comprising:

a modem unit, wherein the modem unit resides on a first semiconductor die, and wherein a power management unit embodied in hardware and an embedded flash memory also resides on the first semiconductor die; and an application unit comprising a memory unit, wherein the memory unit is accessible by the modem unit and the application unit.

18. The mobile communication unit according to claim 17, wherein the modem unit comprises a baseband unit, wherein the baseband unit comprises a central processing unit, wherein an operation program comprises instructions for operating the central processing unit is stored in the memory unit.

19. The mobile communication unit according to claim 17, wherein one or more of calibration data, network parameters, security data and debug data are stored in the embedded flash memory.

20. The mobile communication unit according to claim 17, wherein the modem unit further comprises a baseband unit arranged on a second semiconductor die.

21. A method for producing a mobile communication unit, comprising:

storing one or more of calibration data, network parameters, security data and debug data in a first memory unit;

fabricating a modem unit, wherein the modem unit comprises the first memory unit and a power management unit embodied in hardware on a first semiconductor die, and a baseband unit, and wherein the baseband unit comprises a central processing unit;

storing an operation program for the operation of the central processing unit in a second memory; and fabricating an application unit, wherein the application unit comprises the second memory unit.

22. The method according to claim 21, further comprising:

fabricating a second semiconductor die comprising the baseband unit.

* * * * *